2,899,314

FERMENTATION PROCESS FOODS WITH LOW-SODIUM CONTENT AND METHOD OF PREPARING SAME

Verna R. Rohrkaste, Edwardsville, Ill.

No Drawing. Application October 17, 1955
Serial No. 541,065

1 Claim. (Cl. 99—156)

This invention relates in general to fermentation process foods and more particularly, to vegetables and fruits having a low-sodium content for dietetic purposes, and a certain new and useful method for preparing same.

In recent years there has been constantly increasing research in the field of dietetics for individuals suffering from high blood pressure or hypertension, and from certain cardiac conditions. This research has definitely demonstrated the desirability that individuals so afflicted be restricted to a diet containing minimum quantities of sodium. Since sodium is the common metallic element found in table salt, such diets have been generically, albeit somewhat inaccurately, referred to as "salt free." This restriction against foods containing salt, has, perforce, materially reduced the variety of foods available for inclusion in such diets. Also, the inherent diminution of use of such flavoring agent substantially affects the palatability of the dietetic foods. Therefore, considerable investigative effort has been made to discover methods for preparing foods which may be included in such diets, so as to provide the food individual with as wide and complete a range of choice as possible.

Heretofore, various vegetables and fruits produced by fermentation, such as sauerkraut, pickles, and the like, have been expressly excluded from all such low-sodium diets, as such have historically been prepared by the use of salt, and, have thus contained a relatively great amount thereof. In the current production of sauerkraut, the salting of the shredded cabbage is accomplished either while the cabbage is in curing vats or being conveyed thereto; with salt being customarily added in the ratio of 1.5 to 2.5 lbs. per hundred lbs. of cabbage. The resulting brine or salting solution, which will completely cover the cabbage at all times, has been considered to the present time as a requisite for providing the proper control and environment for the ensuing fermentation process. Salt has been deemed necessary to inhibit the growth of certain micro-organisms productive of enzymes which might interfere with the orderly multi-stage fermentation process. The fermentation is primarily lactic in character with the sugars in the cabbage being broken down, as with glucose, into lactic acid, acetic acid, alcohol, and carbon dioxide; with fructose additionally providing mannitol. Upon completion of fermentation, sauerkraut so produced has been found to contain not less than 1.5% of acid expressed as lactic acid, but contains too high an amount of sodium for rendering the product acceptable as a dietetic food. It has been generally believed that the brine has conduced to the texture of the product.

A similar situation is found in the production of pickles, since the cucumbers are subjected to a salt brine, within which occurs the lactic fermentation. The salt serves two primary purposes: (1) as a suppressant for the proteolytic and pectolytic bacteria, thereby permitting certain of the lactic bacteria to grow; and (2) for withdrawing from the cucumbers water containing certain soluble nutrients. It has been assumed that the salt conduces to the firmness and texture of the processed pickles. Since fermented pickles contain a relatively high percentage of salt, such as 3½% to 4½% by weight in dill pickles, it will be understood that pickles have not been heretofore considered proper in low-sodium diets.

Therefore, it is an object of the present invention to provide fermentation process foods with a low-sodium content. Another object of the present invention is to provide a process for producing low-sodium, fermentation process foods without subjecting same to salting or salt brine.

It is a further object of the present invention to provide a method for producing low-sodium, fermentation process foods wherein sugar is utilized as the primary agent.

Another object of the present invention is to provide a method for producing low-sodium, fermentation process foods, which is economical to perform, and which is readily amenable to commercial production.

It is an additional object of the present invention to provide a process for producing low-sodium sauerkraut, pickles, and the like, which are exceedingly tasty and of excellent texture; and which have a lactic acid content comparable to such prepared by methods heretofore known.

With the above and other objects in view, my invention resides in the novel compositions of matter and novel methods and processes presently described and pointed out in the claims.

The present invention contemplates the production of various vegetables and fruits by subjecting the base food to sugar solution and storing same therein until completion of fermentation, whereby the sodium content of the resultant food will be of sufficiently low order to render the same proper for "salt free" diets.

As exemplary of this invention is the production of a low-sodium sauerkraut, wherein firm heads of mature cabbage are utilized, with the outside leaves being removed, and the heads are then shredded finely. Batches of any convenient size for commercial production may be used, such as preferably 20 gallons or the like. However, for each quart of shredded cabbage there is added 8–10 grams of sugar as dextrose or d-glucose, which is mixed thoroughly with the cabbage, and the mixture is crushed to make its own juice. Thereafter 500 cc. of water for each quart of cabbage is added to the mixture, which when disposed in a proper container will be completely covered thereby. The mixture is transferred to a sterilized crock, jar or other suitable container which is securely covered to prevent aerial contamination, and the container stored under temperature ranging from 64° F. to 80° F., with the lower part of the range being desirable. The sauerkraut will be available for consumption in a period of four to six weeks, after completion of fermentation of the natural sugars in the cabbage. Such sauerkraut may be pasteurized and packaged or canned in accordance with current canning procedures. Sauerkraut is desirably packaged under vacuum conditions so as to prevent any undesirable bacterial action subsequent to fermentation.

During the storage, the multi-stage lactic fermentation process takes place just as in the case of sauerkraut cured in brine. The precise theory of the chemical and bacteriological activity occurring from the use of the sugar solution is not known with scientific exactitude. It seems quite logical, however, to theorize that the added sugar rapidly ferments and conduces to the relatively rapid fermentation of the natural sugars present in the cabbage, so that undesirable bacteria which have heretofore been suppressed by the use of the salt brine are overgrown, and hence, effectively inhibited. Sauerkraut produced by this method has been quantitatively analyzed and found to contain acid as lactic acid in the amount of 1.54% and sodium in the amount of 13.3 milligrams per hundred grams. Thus, such sauerkraut contains that quantity of acid expressed as lactic acid found in sauerkraut produced by heretofore known methods. The lactic acid present in sauerkraut serves to provide same with good keeping qualities and hence, the sauerkraut produced by the present method is as rich in these qualities as sauerkraut produced by the use of brine. It must be noted that the quantity of sodium in sauerkraut produced by the present invention is relatively infinitesimal, being less than the amount customarily found in the drinking water of large cities. In view of this low-sodium content, sauerkraut produced by this method is considered "salt free" and thereby available for dietetic usage. Additionally, such sauerkraut has a proven appetizing palatability, an excellent texture, and color, all of which are immediately comparable to sauerkraut produced with the use of brine.

Another example of the present invention relates to pickles which have been up to the present prepared in brine. As has been well known, in the fermentation process for producing pickles, such as dill, and salt stock from which sweet, sour, and mixed pickles and relish are made, salt has played a most conspicuous role. Serving to suppress the development of certain bacteria to allow desired lactobacilli, primarily L. plantarum, to ferment the sugars in the cucumbers with the production of lactic acid. Additionally, the salt withdraws from the cucumbers water containing certain soluble agents, such as proteins, carbohydrates, etc. However, pickles produced by this process will, expectedly, have a relatively high salt or sodium content, as in the case of genuine dill pickles, the sodium content may range as high as 5% by weight. In preparing salt stock pickles, the same have been customarily subjected to either the low or high salt methods of brining with the resultant products having expectedly high salt content.

With the present invention, cucumbers to be processed into pickles by lactic fermentation are treated with a sugar solution, and hence, a non-saline climate is provided for the fermentation. The method practiced is readily amenable to economical batch operation for commercial purposes. However, the fundamental method may best be described in terms of a small batch operation. To produce a "salt free" basic pickle, cucumbers are cleaned, graded and placed within five gallon jars, which are substantially filled with the cucumbers. The same are then covered with a solution formed by dissolving approximately 375 cc. or about 40–60 grams of sugar in one gallon of water, with 500 cc. of vinegar being added. The container is then covered or sealed and stored for fermentation. At the end of the fermentation period, which is detectable by the cessation of bubbles at the surface, the scum formation is removed or skimmed. Depending upon the size of the pickles, such will be available for consumption within a two to four week period. It will be recognized that the size of a pickle has a direct relationship to the fermentation period, as the larger pickles take a longer time to cure than the smaller ones.

Basic pickles made in accordance with the foregoing can be utilized for the production of sweet pickles, relish, and sour pickles in the manner that such have been heretofore produced from salt stock pickles. For example, in the preparation of "salt free" sweet pickles, the processed "salt free" basic pickle is placed in a quart jar and covered with a solution formed by dissolving approximately 20–25 grams of sugar in 500 cc. of water with 250 cc. of vinegar and a small amount of the indicated flavoring agent being added. The same is then brought to a boil with the pickles being then covered and sealed. To prepare sour pickles the treating composition is, expectedly, devoid of sugar, being an equal mixture of water and vinegar.

Pickles produced in accordance with the present invention have been found to be most appetizing, to have excellent flavor, and very fine texture.

Quantitative analysis of a "salt free" basic pickle produced in accordance with the present invention revealed a salt content of 44 milligrams per hundred grams. It will be recognized that this amount of salt is scarcely as great as that amount normally found in city drinking water and is hence unobjectionable from a dietary standpoint, whereby such pickles are available for low sodium diets.

The present invention may also be utilized in connection with green tomatoes, Hungarian peppers, and the like, which foods prepared thereby reveal a low salt content; in the case of tomatoes such being 27 milligrams per hundred grams, and in the matter of Hungarian peppers of 54 milligrams per hundred grams, whereby said foods are appropriate for dietary purposes.

Thus, in view of the above, it is seen that the present invention comprises a method for producing low-sodium, lactic fermentable fruits and vegetables, which have heretofore not been considered available for dietetic purposes. As shown above, the procedures outlined by the present invention can be economically utilized in commercial production so that the low-sodium vegetables and fruits can be made available on a broad scale retail level. The present method may also be practiced within the home, and since table sugar or dextrose is adequate the procedure may be accomplished most economically.

It should be understood that changes in the methods, compositions, percentages, and combinations set forth may be made without departing from the nature and principle of my invention.

Having thus described my invention, what I claim and desire to secure by Letters Patent is:

The process for preparing a low-sodium content basic pickle of the type from which may be ultimately produced sweet, sour, and mixed pickles, comprising providing a predetermined quantity of cucumbers, cleaning the said cucumbers, then placing same in a coverable container, covering said cucumbers in a sugar solution having a concentration of from about 40 to 60 grams of sugar per gallon of water, adding approximately 500 cc. of vinegar per gallon of water, then closing the container, and then permitting said cucumbers to remain covered by said solution until completion of the fermentation of the sugar.

References Cited in the file of this patent

UNITED STATES PATENTS

"Food Engineering," November 1951, page 160.
"Everybody's Cook Book," Lord, pages 461-463.
"The Low Sodium Cook Book," Payne and Callahan.